United States Patent [19]

Burkhardt et al.

[11] 4,097,455
[45] Jun. 27, 1978

[54] MOULDING COMPOSITIONS OF MIXTURES OF HALOGEN-CONTAINING AND HALOGEN-FREE POLYFUNCTIONAL AROMATIC CYANIC ACID ESTERS

[75] Inventors: Claus Burkhardt; Karl-Heinrich Meyer, both of Krefeld; Kurt Weirauch, Bergisch Gladbach, all of Germany

[73] Assignee: Bayer Aktiengesellschaft, Leverkusen, Germany

[21] Appl. No.: 778,713

[22] Filed: Mar. 17, 1977

[30] Foreign Application Priority Data

Mar. 23, 1976 Germany ............................ 2612312

[51] Int. Cl.² .............................................. C08G 18/76
[52] U.S. Cl. ........................ 260/47 CB; 260/77.5 NC; 260/77.5 AT
[58] Field of Search ................. 260/77.5 AT, 47 CB, 260/2.5 AW, 77.5 NC

[56] References Cited

U.S. PATENT DOCUMENTS

| | | | |
|---|---|---|---|
| 3,250,749 | 5/1966 | Erickson et al. | 260/77.5 AT |
| 3,553,244 | 1/1971 | Grigat et al. | 260/247.1 R |
| 3,684,753 | 8/1972 | Franke et al. | 260/77.5 AT |
| 3,939,124 | 2/1976 | DiBella et al. | 260/77.5 AT |
| 3,993,608 | 11/1976 | Wells | 260/2.5 AW |

OTHER PUBLICATIONS

Noller, *Chemistry of Organic Compounds*, Saunders, Philadelphia, 1951 p. 302.

*Primary Examiner*—M. J. Welsh
*Attorney, Agent, or Firm*—Connolly and Hutz

[57] ABSTRACT

Moulding compositions for the production of mouldings with fire-retarding properties and with a polytriazine structure, comprising mixtures of (A) 10 to 90% by weight of at least one polyfunctional, aromatic halogen-free cyanic acid ester or a prepolymer thereof which is still fusible or soluble in solvents, and (B) 10 to 90% by weight of at least one polyfunctional, aromatic halogen-containing cyanic acid ester or a prepolymer thereof which is still fusible or soluble in solvents.

6 Claims, No Drawings

MOULDING COMPOSITIONS OF MIXTURES OF HALOGEN-CONTAINING AND HALOGEN-FREE POLYFUNCTIONAL AROMATIC CYANIC ACID ESTERS

This invention relates to moulding compositions for the production of flameproof mouldings with a polytriazine structure, consisting of mixtures of halogen-containing and halogen-free polyfunctional aromatic cyanic acid esters.

It is known that high molecular weight polytriazines can be produced by polymerizing difunctional or polyfunctional aromatic cyanic acid esters at temperatures of up to 200° C, optionally in the presence of polymerization activators (cf. German patent specification No. 1,190,184).

It is also known that the polytrimerization of cyanic acid esters to form high molecular weight polytriazines which are insoluble in organic solvents, for example by heating for 10 to 15 hours to temperatures of from about 100° to 150° C, proceeds by way of intermediate stages which can be isolated by cooling to room temperature. In this so-called B-stage, prepolymers have formed from the cyanic acid esters which are still soluble in organic solvents, are still fusible at temperatures of approximately 100° C and can be stored almost indefinitely at room temperature (25° C), cf. Kunststoffe, Vol. 58, 1968, No. 12, pages 827–832 and British patent specification No. 1,305,762.

Since the heat of reaction and shrinkage by which trimerization is accompanied has already occurred by the time the prepolymerization reaction takes place, prepolymers of this type are eminently suitable for the production of mouldings.

By virtue of their favorable mechanical and dielectric properties and their high thermal stability, the polytriazines obtained from polyfunctional, aromatic cyanic acid esters and their prepolymers, optionally in conjunction with fillers or reinforcing supporting materials, such as mats, nonwovens, woven fabrics, rovings of glass fibres, asbestos paper or cloth, or paper are suitable for the production of heavily stressed structural elements and insulating materials, or as laminates for use in electrical engineering (cf. German Auslegeschrift No. 1,720,740).

One disadvantage of mouldings produced from polytriazines is their inadequate behaviour with respect to fire, i.e., they are not fire-retarding.

The most stringent testing conditions for fire-retarding plastics materials are laid down by Underwriters' Laboratories Inc., USA, an independent welfare organization for public safety, in "Tests for Flammability of Plastic Materials UL 94" ( Sept. 17, 1973 and Feb. 1, 1974) for grading the plastics in Class 94 V-O. The achievement of this standard may be equated with fire-retarding behavior of the plastics materials.

In order to improve the fire-retarding properties of polytriazine plastics materials, relatively low molecular weight, halogen-containing substances, such as pentabromodiphenyl ether, have hitherto been added to the cyanic acid esters or their prepolymers in a quantity of about 10% by weight, based on the mixture as a whole. Unfortunately, the addition of compounds such as these adversely affects both the mechanical properties and the thermal stability of the polytriazines. In addition, the low molecular weight additives tent to exude, especially at elevated temperatures, for example in the range of from 60° to 120° C, so that fire-retarding properties can only be obtained for a limited period.

An object of the present invention is to provide systems based on polytriazines which also reach the favourable mechanical and dielectric properties of the polytriazines and which in addition have fire-retarding properties as required in accordance with "Tests for Flammability of Plastics Materials" UL 94 (1973–74) of the Underwriters' Laboratories Inc., for grading in Class 94 V-O. Naturally the polytriazine systems should also contain no additives which migrate after storage at room temperature or at elevated temperatures so that the fire-retarding properties would be reduced or completely lost. Finally, the polytriazine systems should be able to be produced in a simple, reproducible and economic manner.

According to the invention, this object is achieved by the use of mixtures of polyfunctional halogen-free aromatic cyanic acid esters or their prepolymers with polyfunctional, halogen-containing, especially bromine-containing, aromatic cyanic acid esters or their prepolymers for the polycyclotrimerization reaction. For economically achieving the object of the invention, it was by no means obvious to use mixtures of halogenated and halogen-free, polyfunctional aromatic cyanic acid esters because the halogen-containing, especially bromine-containing, cyanic acid esters can only be individually produced in inadequate yields so that the production of the mixtures from separately produced halogen-free cyanic acid esters on the one hand and halogne-containing, especially bromine-containing, cyanic acid esters on the other hand does not represent an economic solution.

Surprisingly, however, the mixtures according to the invention, i.e., also the cyanic acid esters containing halogen, especially bromine, are obtained in excellent yields provided that, for producing the mixtures according to the invention, halogen-free polyfunctional phenols together with halogen-containing, especially bromine-containing polyfunctional phenols are subjected to the reaction with cyanogen halide. It is particularly noteworthy that the content of secondary products, such as unreacted or partially reacted phenols or iminocarbonic acid esters, is extremely small so that the mixtures according to the invention, consisting of substantially pure individual components, show excellent stability in storage even at elevated temperatures of up to about 50° C. Since the impurities act as polymerization catalysts, it is frequently not possible to process the polyfunctional cyanic acid esters obtained in accordance with the prior art under controllable conditions. In many cases, the polymerization reaction is far too fast and too exothermic so that the heat of reaction cannot always be uniformly dissipated. This occasionally results in complete destruction of the polymers.

Accordingly, the present invention relates to moulding compositions for the production of fire-retarding mouldings with a polytriazine structure, comprising mixtures of (A) 10 to 90% by weight of at least one polyfunctional, aromatic, halogen-free cyanic acid ester or a prepolymer thereof which is still fusible or soluble in organic solvents, and (B) 90 to 10% by weight of at least one polyfunctional, aromatic halogen-containing cyanic acid ester or a prepolymer thereof which is still fusible or soluble in organic solvents.

The halogen-free cyanic acid esters preferably correspond to formula (I) [component A]:

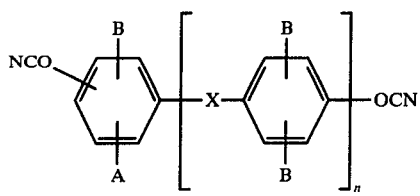

in which
A is a cyanate group, hydrogen, alkyl with 1 to 4 carbon atoms or methoxy carbonyl;
B is hydrogen, alkyl with 1 to 4 carbon atoms or methoxy carbonyl:
n is the number 0 or 1;
X is a single bond, a linear or branched alkylene radical with 1 to 4 carbon atoms, cyclohexylene, —O—, —CO—,

or —SO$_2$—.

In particular, 2,2-bis-(4-cyanatophenyl)-propane is present as component (A) in the mixture.

Preferred halogen-containing cyanic acid esters correspond to the formula (II) [component B]:

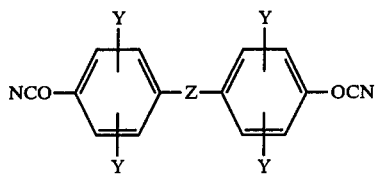

in which
Y is chlorine or bromine, especially bromine, and
Z is a single bond, a linear or branched alkylene group with 1 to 4 carbon atoms, in particular

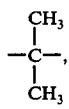

—O—, —CO— or —SO$_2$—.

In particular, tetrabrominated 2,2-bis-(4-cyanatophenyl)-propane is present as component B) in the mixture, 2,2-bis-(4-cyanato-3,5-dibromophenyl)-propane being particularly preferred.

In the case of the brominated, polyfunctional aromatic cyanic acid esters, the mixtures according to the invention preferably consist of from 60% by weight to 90% by weight of component (A) and of from 40 to 10% by weight of component (B). The mixtures of the monomeric cyanic acid esters of components (A) and (B) are preferred.

The following compounds are mentioned by name as examples of component (A): 1,3-dicyanatobenzene; 1,4-dicyanatobenzene; 1,3-dicyanato-5-methyl benzene; 1,3,5-tricyanatobenzene; 1,5-dicyanatonaphthalene; 4,4'-dicyanatodiphenyl; 2,2-bis(4-cyanatophenyl)-propane; 4,4'-dicyanatodiphenyl sulphone; 4,4'-dicyanato-3,3'-dimethoxy carbonyl diphenyl methane; 4,4'-dicyanatodiphenyl methane; 2,2-bis-(4-cyanatodimethyl-phenyl)-ethane; 2,2-bis-(4-cyanatophenyl)-propane; 2,2-bis-(4-cyanatophenyl)-butane; 4,4'-dicyanatobenzophenone; 1,1-bis-(4-cyanatophenyl)-cyclohexane; 4,4'-dicyanatodiphenyl-ether; 4,4'-dicyanatodiphenyl carbonate; 1,1,2-tris-(4-cyanatophenyl)-ethyl benzene and polyphenols of the novolak type according to German Auslegeschrift No. 1,251,023 and German Offenlegungsschrift No. 2,533,322.

The following are mentioned as examples of component (B): 2,2-bis-(4-cyanatodibromophenyl)-methane; 2,2-bis-(4-cyanatodibromophenyl)-propane; 2,2-bis-(4-cyanatodichlorophenyl)-methane; 2,2-bis-(4-cyanatodichlorophenyl)-propane; 4,4'-dicyanatotetrachlorodiphenyl; 4,4'-dicyanatotetrabromodiphenyl; 4,4'-dicyanatotetrachlorodiphenyl ether; 4,4'-dicyanatotetrabromodiphenyl ether; 4,4'-dicyanatotetrachlorobenzophenone; 4,4'-dicyanatotetrabromobenzophenone; 4,4'-dicyanatotetrachlorophenyl sulphone and 4,4'-dicyanatotetrabromodiphenyl sulphone. The 3,5,3',5'-position of the chlorine or bromine substituents is preferred.

In the context of the invention, prepolymers of components A or B are products which are still soluble in organic solvents, such as acetone, ethyl acetate, tetrahydrofuran or dimethyl formamide, or are fusible at approximately 100° C. Prepolymers such as these are converted into polytriazines to a level of approximately 30 to 65%. They can be produced by known methods (see the above-mentioned prior art).

The cyanic acid esters of components A and B may be produced by the methods described in U.S. Pat. No. 3,553,244.

In the case of the brominated cyanic acid esters, the yields are poor.

The mixtures according to the invention may be produced by mixing the powder-form components in suitable conventional mixing units. However, the components may also be mixed in the form of solutions, followed optionally by removal of the solvent, granulation and/or grinding. It is also possible to produce melts of the components, to mix the melts and then to granulate them after cooling.

However, the mixtures according to the invention are preferably prepared by reacting the polyfunctional phenols on which components (A) and (B) are based in the form of alkali or alkaline earth metal phenolates in the required quantitative ratio in aqueous solution together with cyanogen halide dissolved in organic water-immiscible solvents, in the presence of catalytic quantities of a tertiary amine in a highly disperse system at the phase interface to form the corresponding cyanic acid esters.

Particularly pure aromatic cyanic acid ester mixtures are obtained by this process at temperatures below room temperature, preferably at temperatures between 0° and 10° C, and in the neutral to weakly acid pH-range, preferably at pH-values of from about 5.5 to about 7.5. Under these conditions, the reaction takes place at a sufficiently high velocity. However, the aromatic cyanic acid ester mixtures are also formed at higher temperatures and in an alkaline medium.

It is particularly surprising that the hydrolysis of the cyanogen halide in the aqueous solution, which takes place as a secondary reaction, is largely suppressed.

Highly disperse systems may be obtained for example by vigorously stirring, for example at 600 rpm, a mixture of an aqueous phenolate solution with, for example, aromatic hydrocarbons containing cyanogen halide, optionally in the presence of small quantities of surface-active agents.

Highly disperse systems may also be produced by pumping the aqueous phenolate solution together with the organic phase containing cyanogen halide at a high flow rate around a pipe system. It is also common practice to produce highly disperse systems by spraying one phase into the other. As any expert knows, it is possible for this purpose to use such devices as nozzles, perforated plates, frits, etc.

The phenol mixtures used are employed in the form of aqueous phenolate solutions which are best prepared by dissolving the corresponding phenol in an aqueous solution of an alkali metal of alkaline earth metal hydroxide. It is best to use dilute solutions with a phenolate content of normally less than 20% by weight.

Particularly good results are obtained with solutions having a phenolate content of from 3 to 10% by weight, preferably from 4 to 6% by weight.

In cases where the phenolates of components (A) and/or (B) are difficulty soluble in water, however, the polyfunctional phenols on which components (A) and (B) are based may also be dissolved in the required quantitative ratio in organic water-immiscible solvents, optionally together with cyanogen halide, and the resulting solution reacted in the presence of a tertiary amine with an aqueous solution of an alkali or alkaline earth metal hydroxide in a highly disperse system at the phase interface to form the corresponding cyanic acid esters.

Suitable water-immiscible solvents are, for example, optionally substituted aromatic hydrocarbons, such as benzene, toluene, xylenes, ethyl benzene, chlorobenzene, dichlorobenzene, bromobenzene, nitrobenzene, tert.-butyl benzene, and also optionally substituted aliphatic and cycloaliphatic hydrocarbons, such as methylene chloride, chloroform, carbon tetrachloride, ethylene chloride, tetrachlorethane, trichlorethylene, ethylene bromide, n-propyl chloride, methylene bromide, nitromethane, n-hexane, cyclohexane, isooctane, cyclohexanone, cyclopentanone, 2-butanone, also ethers such as diethyl ether and diisopropyl ether. It can also be advantageous to use mixtures of the above mentioned water-immiscible solvents. Of these solvents, it is particularly advantageous to use the aliphatic chlorinated hydrocarbons because they can be emulsified simply by gentle stirring with the aqueous phase and because some of the cyanic acid esters formed dissolve readily therein so that the reaction products can readily be isolated.

In cases where the presence of surface-active substances is required, it is possible to use any ionic or non-ionic emulsifiers which are active in the neutral to weakly acid medium, for example polyglycol ethers.

Suitable tertiary amines are compounds corresponding to the general formula (III):

(III)

in which $R_1$, $R_2$ and $R_3$ are the same or different and represent alkyl, aryl, cycloalkyl, alkaryl and aralkyl radicals with from 1 to 25 carbon atoms which may be attached to one another to form a ring. $R_1$, $R_2$ and $R_3$ preferably represent identical or different alkyl radicals with from 1 to 12 carbon atoms or hydroxyalkyl radicals with from 2 to 6 carbon atoms, the phenyl radical, cyclohexyl radical, benzyl radical, diphenyl radical or, together with the nitrogen atom, the pyridine radical or the diazabicyclooctane radical.

The following are examples of suitable tertiary amines: trimethylamine, triethylamine, tri-n-butylamine, triamylamine, diethyl butylamine, methyl dibutylamine, tribenzylamine, triethanolamine, dimethylaniline, diethylaniline, methylethyl butylamine, tricyclohexylamine, diphenyl methylamine, diethyl cyclohexylamine pyridine, diazabicyclooctane, etc.

The amines may be added both to the aqueous phenolate solution and also to the organic cyanogen halide solution. It can be of advantage to distribute the catalyst between both phases.

The tertiary amines are generally used in quantities of from 0.01 to 10% by weight, based on the total quantity of the phenolic component. Particularly favorable results are obtained with additions of from 0.1 to 1% by weight.

Suitable cyanogen halides are cyanogen chloride and cyanogen bromide, both of which are readily available on a commercial scale. An excess of cyanogen halide is advantageous. It is possible to use quantities representing an excess of from 5 to 100 mole %, based on the phenolic OH-groups present.

The process may be carried out by dispersing an aqueous solution of the phenolate mixture in the solution of the cyanogen halide, present in excess, in one of the abovementioned solvents.

However, it is also possible initially to introduce only part of the cyanogen halide in the organic phase at the beginning of the reaction and to add the rest during the reaction either in the liquid or in the gas phase. In this case, however, an excess of aqueous phenolate solution should be avoided.

The resulting dispersion of the aqueous inorganic salt solution and the solution of the aromatic cyanic acid ester mixture formed in the indifferent solvent readily separates into an organic phase and an aqueous phase on completion of the reaction. The aromatic cyanic acid ester mixture may be recovered from the organic layer after washing out with water and distilling off the solvent.

The process is particularly suitable for continuous working.

If desired, dyes, hardening catalysts, plasticisers, other additives with flameproofing properties, fillers and reinforcing materials may be added to the mixtures according to the invention.

Suitable fillers and reinforcing agents are, generally, any powder-form and/or fibrous products such as, for example, granular fillers such as quartz powder, shale powder, asbestos powder, powdered corundum, chalk, iron powder, aluminum powder, sand, gravel and other fillers of this kind, and also inorganic or organic fibres, especially glass fibres in the standard textile forms of fibres, filaments, rovings, yarns, nonwovens, mats, woven fabrics etc. In this connection, finishes based on aminosilanes have proved to be particularly effective. Similarly, it is possible to use corresponding textile structures or organic, preferably synthetic fibres (polyamides, polyesters) or on the basis of quartz, carbon, metals, etc., also monocrystals (whiskers).

The cyanic acid ester mixtures according to the invention may be combined with the powder-form or fibrous fillers or reinforcing agents before or after the heat treatment of the aromatic cyanic acid esters by basically any method. For example, it is possible to impregnate powder-form or fibrous fillers or reinforcing agents, such as quartz sand or glass cloths, with the polyfunctional aromatic cyanates, optionally in solution. Examples of standard solvents which may be used for this purpose, and which generally have to be removed again, are inert solvents such as acetone, xylene, ethyl acetate, benzene, tetrahydrofuran, chlorobenzene, dibutyl ether, dimethyl formamide and tetramethylene sulphone.

The reaction (polycyclotrimerisation) of the mixtures according to the invention to form flameproofed mouldings with a triazine structure is carried out by known methods, if desired in the presence of hardening catalysts.

The flameproofed mouldings are distinguished by high mechanical strengths, excellent chemical resistance and extremely good thermal stability. The dimensional stability under heat according to Martens of non-reinforced hardened resins amounts in some cases to 250° C and higher. Accordingly, the end products of the process according to the invention may be used, for example, for any applications requiring high strength or chemical stability at elevated temperatures and fire-retarding behaviour. This is particularly the case in vessel and pipe construction by the so-called winding technique, in electrical engineering, in mould and tool making and also in the construction of high-strength components in the lightweight construction of vehicles and in air and space travel.

The parts and percentage contents quoted in the Examples are based on weight unless otherwise stated.

Flammability is tested in accordance with the "Test for Flammability of Plastic Materials UL 94" of the Underwriters' Laboratories Inc., USA (17.9.73 and 1.2.74) for Class 94 V-O.

COMPARISON EXAMPLE 1

A moulding with a polytriazine structure is produced from 2,2-bis-(4-cyanatophenyl)-propane or prepolymer in the presence of a catalyst combination of 0.05% by weight of diazabicyclooctane, 0.10% by weight of pyrocatechol and 0.20% by weight of zinc octoate by heating for 2 hours to 180° C, and is then processed to form test bars measuring 127 × 12.7 × 3.18 mm.

Five of the test bars thus produced are exposed to a flame twice for 10 seconds in strict accordance with UL test 94.

The total burning time after the first exposure is more than 50 seconds and, after the second exposure, more than 100 seconds.

Result: the polytriazine resin based on 2,2-bis-(3-cyanatophenyl)propane does not comply with the conditions for grading plastics materials in Class 94 V-O.

COMPARISON EXAMPLE 2

The following test shows that 2,2-bis-(4-cyanato-3,5-dibromophenyl)-propane can only be obtained in inadequate yields and in inadequate purity by conventional methods. The compound itself has never been reported before.

According to Example 7 of U.S. Pat. No. 3,553,244, 228 parts by weight of 2,2-bis-(4-hydroxyphenyl)-propane are dissolved in 400 parts by weight of acetone and cooled to 0° C. 135 parts by weight of cyanogen chloride are added dropwise at that temperature. 120 parts by weight of triethylamine are then added with external cooling, the temperature being kept below 10° C. On completion of the dropwise addition, the mixture is stirred for 30 minutes, after which the triethylamine hydrochloride which has crystallized out is filtered off. After the acetone has been distilled off, 2,2-bis-(4-cyanatophenyl)-propane is obtained from the filtrate in the form of colorless crystals melting at 77° to 80° C in a quantity of 212 parts by weight (corresponding to a yield of 76%, based on the theoretical amount). The purity amounts to approximately 95% (as determined by IR-spectroscopy).

If 2,2-bis-(4-cyanato-3,5-dibromophenyl)-propane is produced under the conditions of Example 7 of U.S. Pat. No. 3,553,244, the yield is 70% of the theoretical amount and the purity, as determined by IR-analysis, is 78%. The IR-spectrum shows a strong band at 6 μm, indicative of impurities with an imidocarbonate structure

The melting point amounts to 130° – 160° C with decomposition.

EXAMPLE 1

Production of a mixture according to the invention of 85% by weight of 2,2-bis-(4-cyanatophenyl)-propane and 15% by weight of 2,2-bis-(4-cyanato-3,5-dibromophenyl)-propane In a cooled stirrer-equipped vessel with a lateral overflow 840 parts by weight/h of a cyanogen chloride/methylene chloride solution (5% by weight of cyanogen chloride) are intensively emulsified continuously at 5° C with 1050 parts by weight/h of an aqueous solution of a bisphenolate mixture (3.5% by weight of 2,2-bis-(4-hydroxyphenyl)-propane 0.7% by weight of 2,2-bis-(4-hydroxy-3,5-dibromophenyl)-propane, 1.4% by weight of NaOH and 0.05 part by weight of triethylamine). To complete the reaction, the mixture is passed at pH 6.2 through a second water-cooled stirrer-equipped vessel with a laterial overflow. The total residence times is approximately 10 minutes. The mixtures is then collected in a glass vessel in which it separates into two liquid phases. The organic phase is washed 6 times with distilled water in a ratio of 3:1 and subsequently freed from the solvent at a temperature of <60° C/approx. 100 Torr. Removal of the solvent in this way leaves behind colorless crystals which, according to spectroscopy (IR-, NMR - spectrum), consist of a mixture of 85 parts by weight of 2,2-bis-(4-cyanatophenyl)-propane and 15 parts by weight of 2,2-bis-(4-cyanato-3,5-dibromophenyl)-propane. The bromine content amounts to 8% by weight. No secondary products can be detected. No band is present in the IR-spectrum at 6 μm (imidocarbonate). The content of phenolic OH-groups is less than 0.05% by weight (IR-spectroscopic evaluation of the band at 2.8 μm). The yield amounts to 99% of the theoretical amount.

The mixtures according to the invention used in Examples 3 and 4 can be similarly produced.

EXAMPLE 2

Following the procedure of Comparison Example 1, test bars with a bromine content of 8% by weight are produced from a mixture of 170 parts by weight (85%) of 2,2-bis-(4-cyanatophenyl)-propane and 30 parts by weight (15%) of 2,2-bis-(4-cyanato-3,5-dibromophenyl)-propane, and are then exposed twice to a flame in accordance with UL Test 94. The following burning times were observed:

|  | Burning time | | |
|---|---|---|---|
|  | after 1st exposure | after 2nd exposure | total |
| Test bar 1 | 0 sec. | 1 sec. | |
| Test bar 2 | 0 sec. | 9 sec. | |
| Test bar 3 | 0 sec. | 7 sec. | 26 sec. |
| Test bar 4 | 0 sec. | 5 sec. | |
| Test bar 5 | 0 sec. | 4 sec. | |

Result: The total burning time after 10 exposures amounts to 26 seconds. There is no one individual value above 10 seconds. Accordingly, the material complies with the requirements for the grading of plastics materials in Class 94 V-O, according to which no individual value should be above 10 seconds, whilst the total burning time after 10 exposures should not exceed 50 seconds. In addition, the test specimens do not smoulder (according to the test, 30 seconds' smouldering after the second exposure), neither is any dripping of burning or smouldering particles of material to be observed.

If test specimens are produced from prepolymers of the above-mentioned cyanic acid esters in the same quantitative ratio and subjected to the same flame test, the same results are obtained.

EXAMPLE 3

Following the procedure of Comparison Example 1, test specimens with a chlorine content of 24% by weight are produced from a mixture of 60 parts by weight of 2,2-bis-(4-cyanatophenyl)-propane and 150 parts by weight of 2,2-bis-(4-cyanato-3,5-dichlorophenyl)-propane, and exposed twice to a flame in accordance with UL Test 94. The following burning times are observed:

|  | Burning time | | |
|---|---|---|---|
|  | after 1st exposure | after 2nd exposure | total |
| Test bar 1 | 0 sec. | 4 sec. | |
| Test bar 2 | 1 sec. | 8 sec. | |
| Test bar 3 | 0 sec. | 9 sec. | 38 sec. |
| Test bar 4 | 2 sec. | 7 sec. | |
| Test bar 5 | 1 sec. | 6 sec. | |

Result: The total burning time is 38 seconds. There is no one individual value above 10 seconds. The material thus complies with the requirements of Class 94 V-O.

EXAMPLE 4

Following the procedure of Comparison Example 1, test bars with a bromide content of 7% by weight are produced from a mixture of 490 parts by weight of 2,2-bis-(4-cyanatophenyl)-methane and 70 parts by weight of 4,4'-dicyanatotetrabromodiphenyl ether, and are exposed twice to a flame in accordance with UL Test 94. The following burning times are observed:

|  | Burning time | | |
|---|---|---|---|
|  | after 1st exposure | after 2nd exposure | total |
| Test bar 1 | 0 sec. | 6 sec. | |
| Test bar 2 | 1 sec. | 7 sec. | |
| Test bar 3 | 0 sec. | 8 sec. | 35 sec. |
| Test bar 4 | 0 sec. | 3 sec. | |
| Test bar 5 | 2 sec. | 8 sec. | |

Result: The total burning time is 35 seconds. There is no one individual value above 10 seconds. The material thus complies with the requirements of Class 94 V-O.

We claim:

1. Moulding compositions for the production of mouldings with fire-retarding properties comprising mixtures of
   (A) 10 to 90% by weight of at least one polyfunctional, aromatic halogen-free cyanic acid ester or a prepolymer thereof which is still fusible or soluble in solvents, and
   (B) 10 to 90% by weight of at least one polyfunctional, aromatic halogen-containing cyanic acid ester or a prepolymer thereof which is still fusible or soluble in solvents.

2. Moulding compositions as claimed in claim 1, wherein component (A) consists of at least one cyanic acid ester corresponding to formula (I) or a prepolymer thereof which is still fusible or soluble in organic solvents:

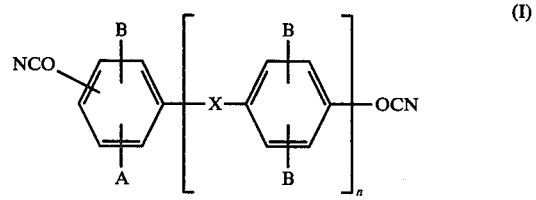

in which

A represents a cyanate group, hydrogen, an alkyl group with from 1 to 4 carbon atoms, or methoxy carbonyl;

B represents hydrogen, an alkyl group with from 1 to 4 carbon atoms, or methoxy carbonyl;

n is the number 0 or 1; and

X represents a single bond, a linear or branched alkyl radical with from 1 to 4 carbon atoms, cyclohexylene, —O—, —CO—,

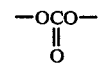

or —SO$_2$—

3. Moulding compositions as claimed in claim 1, wherein component (A) consists of 2,2-bis-(4-cyanatophenyl)-propane.

4. Moulding compositions as claimed in claim 1, wherein component (B) consists of at least one cyanic acid ester corresponding to the formula:

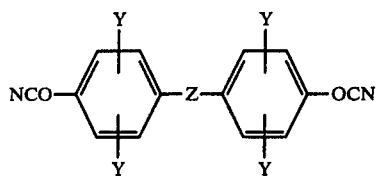

(II)

in which
Y represents chlorine or bromine, and Z is a single bond, a linear or branched alkylene group with from 1 to 4 carbon atoms —O—, —CO— or —SO₂—.

5. Moulding compositions as claimed in claim 1, wherein component (B) represents at least one cyanic acid ester corresponding to formula (II) in which Y represents chlorine or bromine, and Z represents the radical

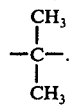

6. Moulding compositions as claimed in claim 1, wherein component (B) represents a cyanic acid ester corresponding to formula (II) in which Y represents bromine and Z represents the radical

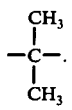

* * * * *